(12) United States Patent
Brugerolle et al.

(10) Patent No.: US 8,136,369 B2
(45) Date of Patent: *Mar. 20, 2012

(54) SYSTEM AND APPARATUS FOR PROVIDING LOW PRESSURE AND LOW PURITY OXYGEN

(75) Inventors: Jean-Renaud Brugerolle, Paris (FR); Bao Ha, San Ramon, CA (US)

(73) Assignees: L'Air Liquide Societe Anonyme pour L'Etude, Paris (FR); et l'Exploitation des Procedes Georges Claude, Paris (FR); Air Liquide Process and Construction, Inc., Houston, TX (US)

(*) Notice: Subject to any disclaimer, the term of this patent is extended or adjusted under 35 U.S.C. 154(b) by 1129 days.

This patent is subject to a terminal disclaimer.

(21) Appl. No.: 11/500,712

(22) Filed: Aug. 8, 2006

(65) Prior Publication Data

US 2008/0011015 A1  Jan. 17, 2008

Related U.S. Application Data

(60) Provisional application No. 60/831,170, filed on Jul. 14, 2006.

(51) Int. Cl.
  *F25J 3/00* (2006.01)

(52) U.S. Cl. ............... 62/652; 62/640; 62/643; 62/644; 62/645; 62/648; 62/650; 62/646

(58) Field of Classification Search .............. 62/646, 62/648, 654, 643, 652, 653
See application file for complete search history.

(56) References Cited

U.S. PATENT DOCUMENTS

| | | | | |
|---|---|---|---|---|
| 2,788,646 A * | 4/1957 | Rice | ........................ | 62/644 |
| 5,666,823 A * | 9/1997 | Smith et al. | ............. | 62/646 |
| 5,799,508 A * | 9/1998 | Bonaquist et al. | ...... | 62/646 |
| 6,134,916 A * | 10/2000 | Jahnke | ...................... | 62/648 |
| 6,182,471 B1 * | 2/2001 | Meagher | .................. | 62/646 |

* cited by examiner

*Primary Examiner* — Cheryl J Tyler
*Assistant Examiner* — John Pettitt
(74) *Attorney, Agent, or Firm* — Elwood L. Haynes

(57) ABSTRACT

A hybrid system which utilizes high purity oxygen from a local pipeline, which is blended with low purity oxygen from an on-site or local cryogenic distillation system, thus resulting in a blend of intermediate quality which satisfies the needs of the customer. In order to offset the operating and energy costs associated with this fairly low profit margin intermediate purity oxygen, high purity nitrogen at high pressure is simultaneously exported to the local pipeline, thereby acting as a credit to the overall system.

4 Claims, 3 Drawing Sheets

Serie 7003

SYSTEM AND APPARATUS FOR PROVIDING LOW PRESSURE AND LOW PURITY OXYGEN

CROSS-REFERENCE TO RELATED APPLICATIONS

This application claims the benefit of U.S. Provisional Application No. 60/831,170, filed Jul. 14, 2006, the entire contents of which are incorporated herein by reference.

BACKGROUND

For typical industrial applications, high purity oxygen is typically produced and supplied at a purity of about 99.5% or higher. This high purity oxygen may be produced on-site, provided to the site by means of a pipeline network, or brought into the site in liquid form, and stored in tanks. For pipeline applications, typically, the pipeline operating pressure is 40 bar or higher. However, there are numerous applications, such as combustion, that require neither this purity level, nor a delivery pressure this high.

Applications, such as glassmaking, steelmaking and gasification for energy production can use low purity oxygen. Typically, for glassmaking or steelmaking applications, the acceptable oxygen purity level may be as low as about 90%. Typically, for gasification applications, the required oxygen purity level may be as low as about 95%, or even about 85%.

The power required to compress the gaseous oxygen to such high pressure contributes significantly to the production and supply cost of the product oxygen. This cost of compression can account for more than about 50% of the energy required to perform the separation of oxygen from air. As applications develop and are identified that require relatively impure, low pressure oxygen, a solution is required that will allow such a product to be provided to the customer in a cost-effective way.

The person skilled in the art would recognize that there are currently five basic solutions to the above problem.

The first solution would be to use a VSA or PSA based system. Vacuum swing adsorption (VSA) or pressure swing adsorption (PSA) processes use a non-cryogenic technology based on nitrogen adsorption through a molecular sieve. These types of units produce low purity oxygen, typically between about 90% and about 95% purity. Typically, the VSA produces oxygen at around 1.03 bar, and the PSA produces oxygen at between about 2 bar and 4 bar. These technologies tend to be moderately cost effective, however, the reliability of this technology requires that expensive liquid backup systems be installed. Other non-cryogenic adsorption processes, such as temperature swing adsorption (TSA), temperature-pressure swing adsorption (TPSA) process may also be used, but suffer from similar disadvantages. The adsorption solution is described in several technical papers, such as U.S. Pat. Nos. 5,114,440, 5,679,134, and 6,332,915.

The second solution would be to use a small, standardized, pre-designed and modularized cryogenic air separation unit. These units produce moderately low purity oxygen, typically between about 95% and about 98.5%. This technology is more reliable than the adsorption based technologies, however, a liquid backup system would typically still be required. This cryogenic process is usually the basic double column process and is widely used in the air separation industry.

The third solution would be to co-produce low purity and low pressure oxygen from a liquid production plant and utilize the existing storage facilities as the backup source The fourth solution would be to install an air separation plant that would provide oxygen at two purity levels. Typically, if all the oxygen is removed at a lower purity level, the energy requirement of the plant may be reduced on the order of about 10%. A basic cryogenic air separation plant is actually more efficient if, for example, one half of the oxygen is extracted at a high purity level, and the other half of the oxygen is extracted at a lower purity level, and if a traditional power usage is assigned to the high purity portion then the resulting power usage for low purity oxygen portion can be reduced on the order of about 20%.

This sort of bi-purity arrangement is advantageous, for example, for iron metallurgy applications. The blast furnace may require a lower purity oxygen, while the steelworks may require a higher purity oxygen. While this type of solution works well in theory, practical considerations, such as customer demand changes, fluctuations in the different loads, etc. make this solution marginal at best.

The fifth, and final, solution would be to utilize an oxygen pipeline. This solution is only available should the consumer be in close proximity to an existing pipeline. Typically, these pipelines operate at pressures of about 40 bar or higher. Such a solution would require taking high value added, high purity and high pressure oxygen and reducing the pressure to provide low pressure oxygen at a much higher purity than required by the customer. This solution is not efficient since high purity and high pressure oxygen is used to supply a demand for low purity and low pressure. Its first investment cost is low and can only be used for short term needs but not for long term operations.

For the foregoing reasons, a need exists within the industry for a system that will provide low purity and low pressure oxygen to a customer at an economically attractive price.

SUMMARY

The present invention is directed to a method and apparatus that satisfies the need in general for a system that will provide a means for providing low pressure and low purity oxygen to customers, while minimizing the installed cost and operating cost associated with large, on-site facilities. The present invention represents a hybrid system which utilizes high purity oxygen from a local pipeline, which is blended with low purity oxygen from an on-site or local cryogenic distillation system, thus resulting in a blend of intermediate quality which satisfies the needs of the customer. In order to offset the operating and energy costs associated with the intermediate purity oxygen, high purity nitrogen at high pressure is simultaneously exported to the local pipeline, thereby acting as a credit to the overall system (in general, there usually is a nitrogen pipeline in the same trench as the oxygen pipeline).

In one aspect of the present invention, a method for providing low pressure and intermediate purity oxygen is provided. The method includes the steps of:

a) providing a cryogenic distillation system, wherein said cryogenic distillation system produces a first liquid oxygen;

b) increasing the pressure of the first pressure oxygen to a first pressure;

c) providing a high purity oxygen vapor stream from a pipeline at a second pressure, wherein said second pressure is greater than said first pressure;

d) cooling and at least partially condensing said high purity oxygen vapor stream and reducing its pressure to approximately said first pressure, through a pressure reducing device;

e) combining said at least partially condensed high purity oxygen stream and said first liquid oxygen stream to produce an intermediate purity liquid oxygen;

f) vaporizing said intermediate purity liquid oxygen thereby producing an intermediate purity oxygen vapor stream; and g) warming the intermediate purity oxygen vapor stream, thereby producing a warm intermediate purity oxygen vapor stream.

In another aspect of the present invention, an apparatus for providing low pressure and intermediate purity oxygen is provided. The apparatus includes:

a) a cryogenic distillation system, wherein said cryogenic distillation system produces a first liquid oxygen stream;

b) a mean to increase the pressure of the first liquid oxygen stream to a first pressure;

c) a pressure reducing device for reducing the pressure of a high purity oxygen stream, at a second pressure, to approximately said first pressure; and d) a first heat exchanging device for vaporizing said first liquid oxygen stream and a portion of said reduced pressure high purity oxygen stream, thereby producing an intermediate purity oxygen vapor stream.

BRIEF DESCRIPTION OF DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
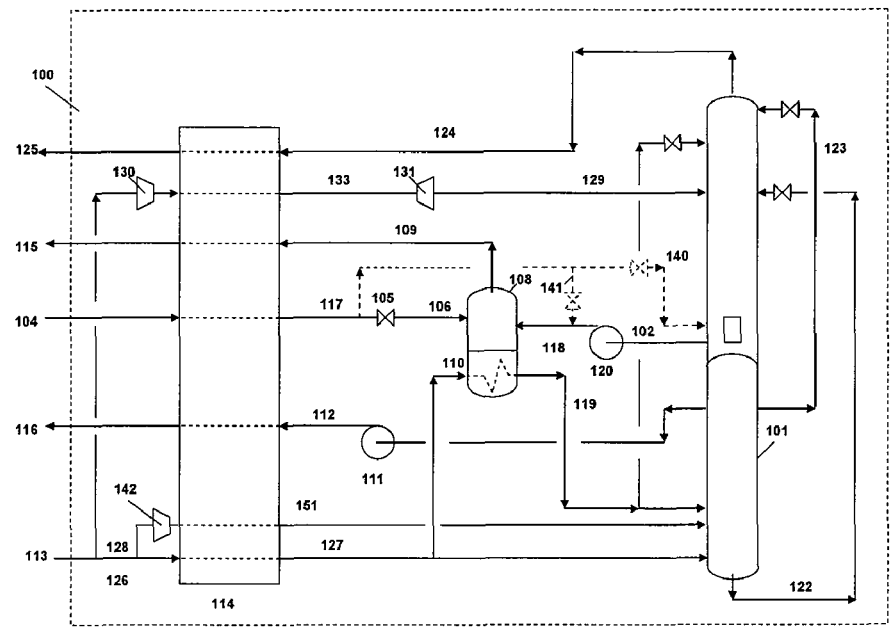
FIG. 1 is a schematic representation of one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used in this application, all the percentage purities mentioned are molar purities.

As used in this application, intermediate purity is defined as a purity level of less than about 99.5%. Alternately, intermediate purity may be defined as having a purity level of 98% or less. Alternately, intermediate purity may be defined a having a purity level of 95% or less. Alternately, intermediate purity may be defined as having a purity level of between about 85% and about 99.5%. Alternately, intermediate purity may be defined as having a purity level of between about 85% and about 98%. Alternately, intermediate purity may be defined as having a purity level of between about 85% and about 95%.

As used in this application high purity is defined as having a purity of greater than about 99.5%. Alternately, high purity may be defined as having a purity level of greater than about 98%.

As used in this application, typical oxygen or nitrogen pipeline pressures are defined as being about 40 bar. Alternately, typical oxygen or nitrogen pipeline pressures may be between about 40 bar and about 65 bar.

As used in this application, a typical cryogenic distillation system produces a nitrogen vapor stream that will typically have a pressure of between about 3.5 bar and about 11 bar. Alternately, the nitrogen vapor stream may have a pressure of between about 5 bar and about 7 bar. Alternately, the nitrogen vapor stream may have a pressure of between about 5.5 bar and about 6.6 bar.

As used in this application, a typical cryogenic distillation system produces a liquid oxygen stream that will typically have a pressure of between about 1.3 bar and about 2 bar. Alternately, the liquid oxygen stream may have a pressure of between about 1.4 bar and about 1.8 bar.

As used in this application, low pressure gaseous oxygen is defined as having a pressure of between about 2 bar and 2.5 bar. Alternately, low pressure gaseous oxygen is defined as having a pressure of between about 2.1 bar and 2.4 bar.

FIG. 1 is a stylized diagram depicting an illustrative embodiment of an apparatus 100 in accordance with the present invention. The apparatus 100 comprises a cryogenic distillation system 101, a pressure reducing device 105, a first heat exchanging device 108, a pressure increasing device 111, and a second heat exchanging device 114.

The cryogenic distillation system 101 may be of any design known to the skilled artisan that is capable of producing a low purity liquid oxygen stream and a high purity nitrogen vapor stream. Such system may include fluid transfer devices, such as liquid pumps to provide liquid products above the pressures of the columns. For illustration purposes, a traditional double column distillation system is shown in FIG. 1. The pressure reducing device 105 may be of any design known to the skilled artisan that is capable of reducing the pressure of cooled or liquefied high purity oxygen from typical pipeline pressures down to the approximate pressure at which a cryogenic distillation system produces liquid oxygen. Such pressure reducing devices 105 may include, but are not limited to, Joule-Thompson valves and turboexpanders. The first heat exchanging device 108 and the second heat exchanging device 114 may be of any design known to the skilled artisan. The pressure increasing device 111 may be of any design known to the skilled artisan that is capable of increasing the working pressure of a cryogenic liquid.

In one embodiment of the present invention a high purity oxygen vapor stream 104 is provided. This high purity oxygen vapor stream 104 has a pressure that is approximately equal to the typical pressure within an oxygen pipeline. This high purity oxygen vapor stream 104 is introduced into the second heat exchanging device 114, wherein it will exchange heat with streams 112, 124 and 109 (hereinafter more fully described). The result of this heat transfer process within the second heat exchanger device 114 will be a cold high purity oxygen stream 117, which may be at least partially condensed. If the oxygen pressure exceeds its critical pressure, there will be no phase change and stream 117 will be cooled to a temperature colder than its critical temperature. The cold high purity oxygen stream 117 is then directed to the pressure reduction device 105, which results in an at least partially condensed high purity oxygen stream 106.

The at least partially condensed high purity oxygen stream 106 is then introduced into the first heat exchanging device 108, wherein it will be combined with a first liquid oxygen stream 118, which is being output from the cryogenic distillation system 101 via stream 102 and pumped by device 120 to the pressure of device 108, thereby resulting in an intermediate purity oxygen. If the pressure increase of device 120 is low it may be possible to use hydraulic liquid head to increase the pressure of stream 102. This intermediate purity oxygen will be vaporized against a condensing air stream 110. The result of this heat transfer process within the first heat exchange device 108 will be an intermediate purity oxygen vapor stream 109. This intermediate purity oxygen vapor stream 109 is then introduced into the second heat exchange device 114, wherein it will be warmed by exchanging heat with other streams to yield the warm intermediate purity low pressure gaseous oxygen stream 115, which may then be sent to the end user.

In another embodiment, the high purity oxygen stream 141 is first combined with a first liquid oxygen stream 118, thereby resulting in an intermediate purity oxygen stream. The intermediate purity oxygen stream is then introduced into the first heat exchanging device 108, wherein it will exchange heat with stream 110 to yield an intermediate purity oxygen vapor stream 109

A gaseous feed air stream 113 is pretreated using methods and devices well known to those skilled in the art, then introduced into the second heat exchange device 114, wherein it exchanges heat with streams 109, 124 and 112 (hereinafter more fully described). A portion of stream 113 may be sent via stream 128 to a system of compressor-expander 130 and 131 to provide the necessary refrigeration for the cryogenic unit. As a result of this heat transfer, the gaseous feed air stream 126 is cooled and introduced into the cryogenic distillation system 101. The cryogenic distillation system 101 produces a low purity liquid oxygen stream 102, and a liquid nitrogen stream 150. The pressure of the low purity liquid oxygen stream 102 is increased then combined with the at least partially condensed high purity oxygen 106 inside the first heat exchanging device 108, resulting in an intermediate purity oxygen. The intermediate purity oxygen will exchange heat with the air stream 110 inside the first heat exchanging device 108. The result of this heat transfer is that the intermediate purity oxygen will at least partially vaporize into an intermediate purity oxygen vapor stream 109. The liquid nitrogen stream 150 is extracted from the distillation system and then be introduced to pressure increasing device 111, resulting in a high pressure liquid nitrogen stream 112. This high pressure liquid nitrogen stream 112 is then introduced to second heat exchange device 114, wherein it exchanges heat with streams 126 and 104, resulting in a vaporized high pressure nitrogen stream 116, which may then be sent to an end user or introduced into a pipeline.

As illustrated in FIG. 1, in one embodiment some or all of stream 113 may pass through a pressure reduction device 142 prior to admission into second heat exchange device 114.

As illustrated in FIG. 1, in one embodiment a portion 140 of the high purity oxygen stream 117 may be sent via stream 140 to the cryogenic distillation system 101. It is possible to send the totality of the high purity oxygen stream 117 to the column system 101, in this situation the mixing of high purity and low purity oxygen takes place in the sump of one column of the distillation system 101. This configuration would result in slightly warmer sump temperature which results in slightly higher system pressure, however, the richer vapor generated at the sump is slightly favorable for the distillation.

Figure 2:
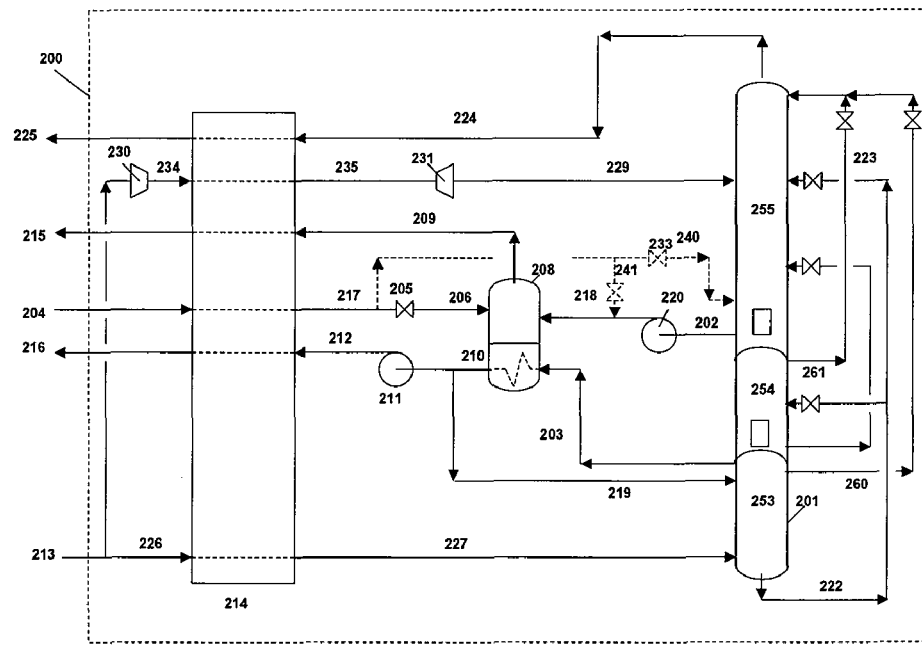
FIG. 2 is a schematic representation of another embodiment of the present invention.

FIG. 2 is similar to FIG. 1 but the distillation system 101, instead of being a traditional double column system, is a triple column system. The mixture of high purity oxygen 206 and low purity oxygen 218 is vaporized into an intermediate purity oxygen vapor stream 209 by exchanging heat with a nitrogen vapor stream 203 originated from a column of the distillation system 201. This arrangement can maximize the flow of the high purity nitrogen 203. A portion of the condensed nitrogen stream 210 can feed the pressure increasing device 211 and vaporized in exchanger 214 to yield the vaporized high pressure stream 216. Of course, this liquid nitrogen feeding the device 211 can also be extracted from the cryogenic distillation system 201 if so desired.

FIG. 2 is also a stylized diagram depicting an illustrative embodiment of an apparatus 200 in accordance with the present invention. The apparatus 200 comprises a cryogenic distillation system 201, a first pressure reducing device 205, a second pressure reducing device 233, a first heat exchanging device 208, a pressure increasing device 211, and a second heat exchanging device 214.

The cryogenic distillation system 201 may be of any design known to the skilled artisan that is capable of producing a low purity liquid oxygen stream and a high purity nitrogen vapor stream. The pressure reducing device 205 may be of any design known to the skilled artisan that is capable of reducing the pressure of cooled or liquefied high purity oxygen from typical pipeline pressures down to the approximate pressure at which liquid oxygen can be vaporized against condensing air or condensing nitrogen vapor of the high pressure column. The pressure at which the liquid oxygen can be vaporized is higher for the triple column than the corresponding pressure for the double column. Such pressure reducing devices 205 include, but are not limited to, Joule-Thompson valves and turboexpanders. The first heat exchanging device 208 and the second heat exchanging device 214 may be of any design known to the skilled artisan. The pressure increasing device 211 may be of any design known to the skilled artisan that is capable of increasing the working pressure of a cryogenic liquid.

In one embodiment of the present invention a high purity oxygen vapor stream 204 is provided. This high purity oxygen vapor stream 204 has a pressure that is approximately equal to the typical pressure within an oxygen pipeline. This high purity oxygen vapor stream 204 is introduced into the second heat exchanging device 214, wherein it will exchange heat with other streams. The result of this heat transfer process within the second heat exchanger device 214, will be a cold high purity oxygen stream 217, which may be at least partially condensed or at below its critical temperature if its pressure is above its critical pressure. A portion or all of this cold high purity oxygen stream 217 may be directed toward a second pressure reducing device 233 the outlet pressure of the second pressure reducing device 233 will be approximately equal to the pressure of the low pressure column in the cryogenic distillation system 201. The cold low pressure pure oxygen stream 240 may then be introduced into column 255 of the cryogenic distillation system 201. The cold high purity oxygen stream 217 can be directed to the first pressure reduction device 205, which results in an at least partially condensed high purity oxygen stream 206.

The at least partially condensed high purity oxygen stream 206 is then introduced into the first heat exchanging device 208, wherein it will be combined with a low purity liquid oxygen stream 218 resulting in an intermediate purity oxygen. This intermediate purity oxygen will exchange heat with stream 203, which will be discussed later. The result of this heat transfer process within the first heat exchange device 208 will be an intermediate purity oxygen vapor stream 209. This intermediate purity oxygen vapor stream 209 is then introduced into the second heat exchange device 214. As a result of this heat transfer, the cool intermediate purity oxygen vapor stream 209 will be heated and become a warm intermediate purity low pressure gaseous oxygen stream 215, which may then be sent to the end user.

In another embodiment, the at least partially condensed high purity oxygen stream 206 is first combined with a low purity liquid oxygen stream 218, thereby resulting in an intermediate purity oxygen stream. The intermediate purity oxygen stream is then introduced into the first heat exchanging device 208, wherein it will exchange heat with stream 203, which will be discussed later. The result of this heat transfer process within the first heat exchange device 208 will be an intermediate purity oxygen vapor stream 209.

A gaseous feed air stream 213 is pretreated using methods and devices well known to those skilled in the art then introduced into the second heat exchange device 214, wherein it exchanges heat with streams 212, 209 and 224. A portion of stream 213 may be sent via stream 228 to a system of compressor-expander 230 and 231 to provide the necessary refrigeration for the cryogenic unit. As a result of this heat transfer, the gaseous feed air stream 227 is cooled and introduced into the cryogenic distillation system 201.

The cooled feed air stream is sent to the bottom of the high pressure column 253 of the cryogenic distillation system 201, where it separates into an oxygen-enriched bottom fraction 222 and a nitrogen-enriched top fraction 260. A portion of the oxygen enriched bottom fraction 222 then enters the medium pressure column 254. A portion of the oxygen enriched bottom fraction 222 may also enter the low pressure column 255 A portion of the nitrogen-enriched is removed as a high purity nitrogen vapor stream 203 at the top of the column 253. Nitrogen gas at the top of the column 253 is condensed in condenser by heat exchange with the bottom liquid of the medium pressure column 254. The nitrogen-enriched top fraction 260 feeds the low pressure column as reflux. A nitrogen-enriched liquid is optionally extracted at the top of the column 254 and sent to the column 255 as another feed. If its purity is equivalent with stream 260 it can also serve as reflux. An impure nitrogen stream 224 is removed from low pressure column 255, warmed in the second heat exchanging device 214, and removed from the system as waste 225. From the above description, the cryogenic distillation system 201 produces a low purity liquid oxygen stream 202, and a high purity nitrogen vapor stream 203.

In one embodiment, a portion of gaseous feed air stream 228 is sent to a compression device 230, which results in a warm compressed feed air stream 234. The compression device 230 may be of any design known to the skilled artisan that is capable of compressing pre-treated feed air to a cryogenic distillation system. Such compression devices 230 may include, but are not limited to, compressors. The warm compressed feed air stream 234 is then introduced into second heat exchanging device 214, where it will exchange heat with streams 209, 212 and 224. As a result of this heat transfer, the warm compressed feed air stream 234 is cooled into a cool compressed feed air stream 235. The cool compressed feed air stream 235 is then sent to an expansion device 231, which results in a cold feed air stream 229. The expansion device 231 may be of any design known to the skilled artisan that is capable of expanding compressed feed air to a cryogenic distillation system. Such expansion devices 231 may include, but are not limited to, turboexpanders. This cold feed air stream 229 is then introduced into the low pressure column 255 of the cryogenic distillation system 201. This cold feed air stream can also be fed to the medium pressure column 254.

The low purity liquid oxygen stream 202 is combined with the at least partially condensed high purity oxygen 206 inside the first heat exchanging device 208, resulting in an intermediate purity oxygen. The intermediate purity oxygen will exchange heat with the warmer high purity nitrogen vapor stream 203 The result of this heat transfer is that the warm high purity nitrogen vapor stream 203 will condense into a high purity liquid nitrogen stream 210, and the intermediate purity oxygen will at least partially vaporize into an intermediate purity oxygen vapor stream 209. The high purity liquid nitrogen stream will then be introduced at least in part to pressure increasing device 211, resulting in a warm high pressure liquid nitrogen stream 212. It is useful to note the high purity liquid nitrogen stream can also be extracted from the column 253 or any column of the distillation system 201 and sent to the pressure increasing device 211. This high pressure liquid nitrogen stream 212 is then introduced to second heat exchange device 214, wherein it exchanges heat with streams 226, 204 and 234, resulting in a vaporized high pressure nitrogen stream 216, which may then be sent to an end user or introduced into a pipeline.

The high purity oxygen is normally being provided by a pipeline, but it can also be derived from other sources, such as a pumped vaporized liquid from a tank.

The high purity liquid nitrogen is needed when the vaporized liquid feed a nitrogen pipeline, it is possible however to use an impure liquid nitrogen stream, then pressurize, vaporize and warm to yield a pressurized gaseous nitrogen stream which could be expanded at a warm temperature or injected into a gas turbine for power recovery (not shown).

Figure 3:
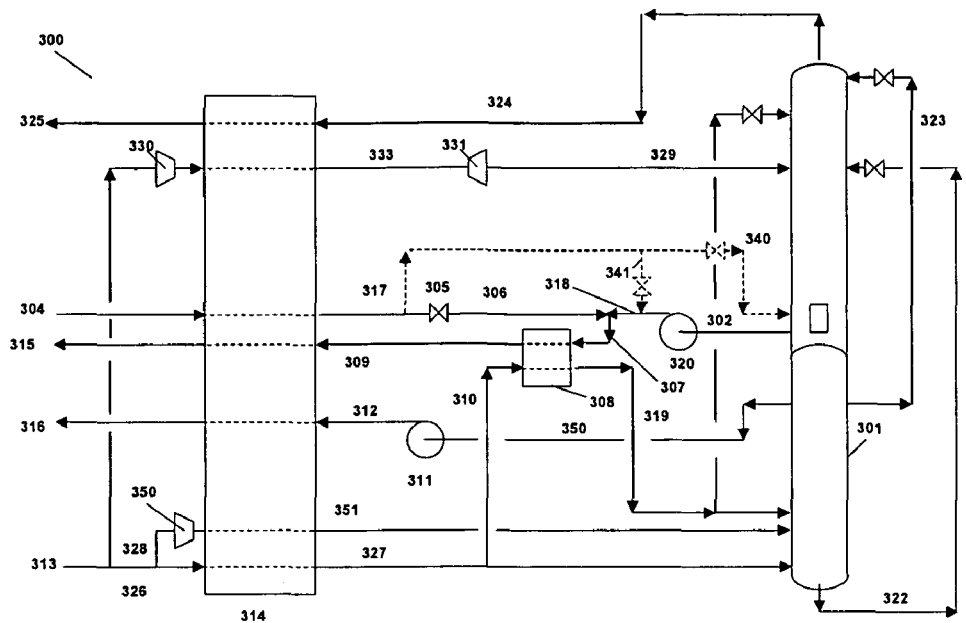
FIG. 3 is a schematic representation of another embodiment of the present invention

FIG. 3 is a stylized diagram depicting an illustrative embodiment of an apparatus 300 in accordance with the present invention. The apparatus 300 comprises a cryogenic distillation system 301, a pressure reducing device 305, a first heat exchanging device 308, a pressure increasing device 311, and a second heat exchanging device 314.

The cryogenic distillation system 301 may be of any design known to the skilled artisan that is capable of producing a low purity liquid oxygen stream and a high purity nitrogen vapor stream. Such system may include fluid transfer devices, such as liquid pumps to provide liquid products above the pressures of the columns. For illustration purposes, a traditional double column distillation system is shown in FIG. 3. The pressure reducing device 305 may be of any design known to the skilled artisan that is capable of reducing the pressure of cooled or liquefied high purity oxygen from typical pipeline pressures down to the approximate pressure at which a cryogenic distillation system produces liquid oxygen. Such pressure reducing devices 305 may include, but are not limited to, Joule-Thompson valves and turboexpanders. The first heat exchanging device 308 and the second heat exchanging device 314 may be of any design known to the skilled artisan. The pressure increasing device 311 may be of any design known to the skilled artisan that is capable of increasing the working pressure of a cryogenic liquid.

In one embodiment of the present invention a high purity oxygen vapor stream 304 is provided. This high purity oxygen vapor stream 304 has a pressure that is approximately equal to the typical pressure within an oxygen pipeline. This high purity oxygen vapor stream 304 is introduced into the second heat exchanging device 314, wherein it will exchange heat with streams 312, 324 and 309 (hereinafter more fully described). The result of this heat transfer process within the second heat exchanger device 314 will be a cold high purity oxygen stream 317, which may be at least partially condensed. If the oxygen pressure exceeds its critical pressure, there will be no phase change and stream 317 will be cooled to a temperature colder than its critical temperature. The cold high purity oxygen stream 317 is then directed to the pressure reduction device 305, which results in an at least partially condensed high purity oxygen stream 306.

The at least partially condensed high purity oxygen stream 306 is then combined with a first liquid oxygen stream 318, which is being output from the cryogenic distillation system 301 via stream 302 and pumped by device 320 to the pressure of device 308, thereby resulting in an intermediate purity oxygen 307. The intermediate purity oxygen stream 307 is then introduced into the first heat exchanging device 308, wherein it will be vaporized against a condensing air stream 310. The result of this heat transfer process within the first heat exchange device 308 will be an intermediate purity oxygen vapor stream 309. This intermediate purity oxygen vapor stream 309 is then introduced into the second heat exchange device 314, wherein it will be warmed by exchanging heat with other streams to yield the warm intermediate purity low pressure gaseous oxygen stream 315, which may then be sent to the end user.

In another embodiment, the high purity oxygen stream 341 is first combined with a first liquid oxygen stream 318, thereby resulting in an intermediate purity oxygen stream. The intermediate purity oxygen stream is then introduced into the first heat exchanging device 308, wherein it will exchange heat with stream 310 to yield an intermediate purity oxygen vapor stream 309

A gaseous feed air stream 313 is pretreated using methods and devices well known to those skilled in the art, then introduced into the second heat exchange device 314, wherein it exchanges heat with streams 309, 324 and 312 (hereinafter more fully described). A portion of stream 313 may be sent via stream 328 to a system of compressor-expander 330 and 331 to provide the necessary refrigeration for the cryogenic unit. As a result of this heat transfer, the gaseous feed air stream 326 is cooled and introduced into the cryogenic distillation system 301. The cryogenic distillation system 301 produces a low purity liquid oxygen stream 302, and a liquid nitrogen stream 350. The pressure of the low purity liquid oxygen stream 302 is increased then combined with the at least partially condensed high purity oxygen 306 inside the first heat exchanging device 308, resulting in an intermediate purity oxygen. The intermediate purity oxygen will exchange heat with the air stream 310 inside the first heat exchanging device 308. The result of this heat transfer is that the intermediate purity oxygen will at least partially vaporize into an intermediate purity oxygen vapor stream 309. The liquid nitrogen stream 350 is extracted from the distillation system and then be introduced to pressure increasing device 311, resulting in a high pressure liquid nitrogen stream 312. This high pressure liquid nitrogen stream 312 is then introduced to second heat exchange device 314, wherein it exchanges heat with streams 326 and 304, resulting in a vaporized high pressure nitrogen stream 316, which may then be sent to an end user or introduced into a pipeline.

As illustrated in FIG. 3, in one embodiment a portion 340 of the high purity oxygen stream 317 may be sent via stream 340 to the cryogenic distillation system 301. It is possible to send the totality of the high purity oxygen stream 317 to the column system 301, in this situation the mixing of high purity and low purity oxygen takes place in the sump of one column of the distillation system 301. This configuration would result in slightly warmer sump temperature which results in slightly higher system pressure, however, the richer vapor generated at the sump is slightly favorable for the distillation.

Figure 4:
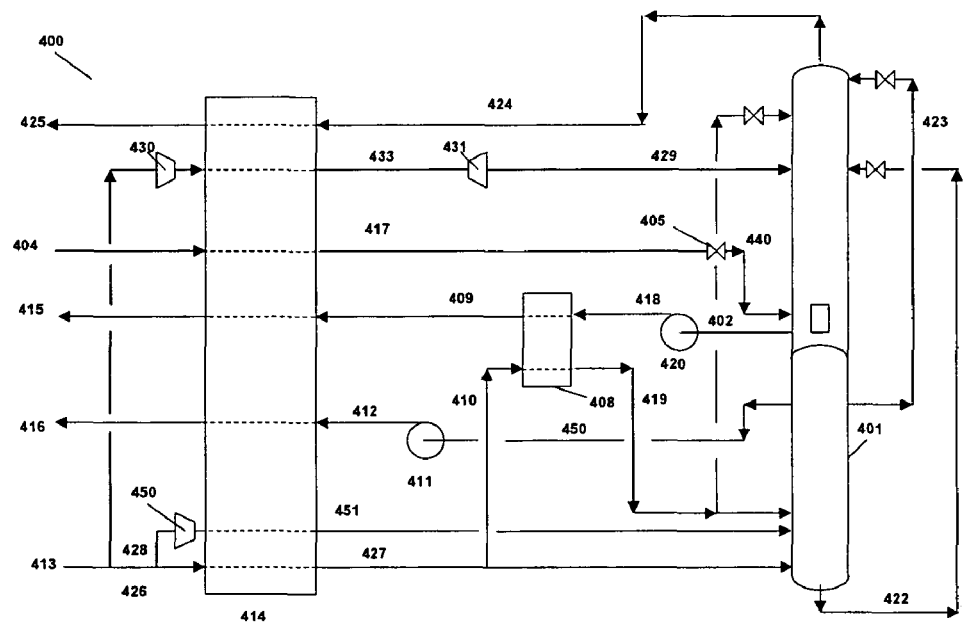
FIG. 4 is a schematic representation of another embodiment of the present invention.

FIG. 4 is a stylized diagram depicting an illustrative embodiment of an apparatus 400 in accordance with the present invention. The apparatus 400 comprises a cryogenic distillation system 401, a pressure reducing device 405, a first heat exchanging device 408, a pressure increasing device 411, and a second heat exchanging device 414.

The cryogenic distillation system 401 may be of any design known to the skilled artisan that is capable of producing a low purity liquid oxygen stream and a high purity nitrogen vapor stream. Such system may include fluid transfer devices, such as liquid pumps to provide liquid products above the pressures of the columns. For illustration purposes, a traditional double column distillation system is shown in FIG. 4. The pressure reducing device 405 may be of any design known to the skilled artisan that is capable of reducing the pressure of cooled or liquefied high purity oxygen from typical pipeline pressures down to the approximate pressure at which a cryogenic distillation system produces liquid oxygen. Such pressure reducing devices 405 may include, but are not limited to, Joule-Thompson valves and turboexpanders. The first heat exchanging device 408 and the second heat exchanging device 414 may be of any design known to the skilled artisan. The pressure increasing device 411 may be of any design known to the skilled artisan that is capable of increasing the working pressure of a cryogenic liquid.

In one embodiment of the present invention a high purity oxygen vapor stream 404 is provided. This high purity oxygen vapor stream 404 has a pressure that is approximately equal to the typical pressure within an oxygen pipeline. This high purity oxygen vapor stream 404 is introduced into the second heat exchanging device 414, wherein it will exchange heat with streams 412, 424 and 409 (hereinafter more fully described). The result of this heat transfer process within the second heat exchanger device 414 will be a cold high purity oxygen stream 417, which may be at least partially condensed. If the oxygen pressure exceeds its critical pressure, there will be no phase change and stream 417 will be cooled to a temperature colder than its critical temperature. The cold high purity oxygen stream 417 is then directed to the pressure reduction device 405, which results in an at least partially condensed high purity oxygen stream 440.

The at least partially condensed high purity oxygen stream 440 is then introduced into cryogenic distillation system 401. A first liquid oxygen stream 418 is output from the cryogenic distillation system 401 via stream 402 and pumped by device 420 to the pressure of device 408. The first liquid oxygen stream 418 is then introduced into the first heat exchanging device 408, wherein it will be vaporized against a condensing air stream 410. The result of this heat transfer process within the first heat exchange device 408 will be an oxygen vapor stream 409. This oxygen vapor stream 409 is then introduced into the second heat exchange device 414, wherein it will be warmed by exchanging heat with other streams to yield the warm low pressure gaseous oxygen stream 415, which may then be sent to the end user.

Figure 5:
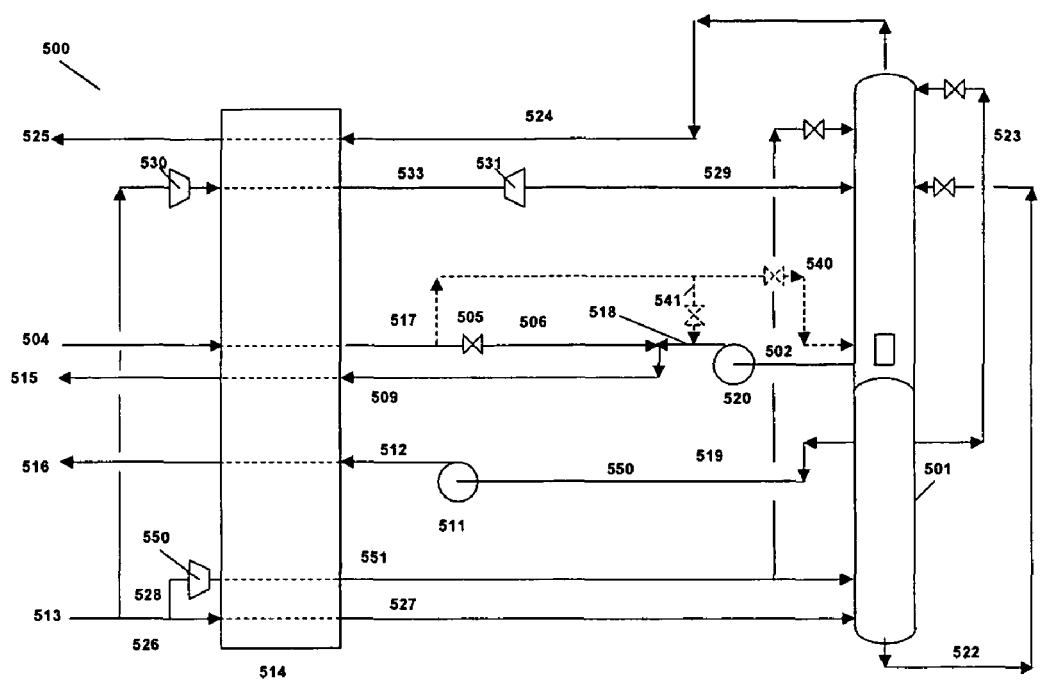
FIG. 5 is a schematic representation of another embodiment of the present invention.

FIG. 5 is a stylized diagram depicting an illustrative embodiment of an apparatus 500 in accordance with the present invention. The apparatus 500 comprises a cryogenic distillation system 501, a pressure reducing device 505, a pressure increasing device 511, and a heat exchanging device 514.

The cryogenic distillation system 501 may be of any design known to the skilled artisan that is capable of producing a low purity liquid oxygen stream and a high purity nitrogen vapor stream. Such system may include fluid transfer devices, such as liquid pumps to provide liquid products above the pressures of the columns. For illustration purposes, a traditional double column distillation system is shown in FIG. 3. The pressure reducing device 505 may be of any design known to the skilled artisan that is capable of reducing the pressure of cooled or liquefied high purity oxygen from typical pipeline pressures down to the approximate pressure at which a cryogenic distillation system produces liquid oxygen. Such pressure reducing devices 505 may include, but are not limited to, Joule-Thompson valves and turboexpanders. The heat exchanging device 514 may be of any design known to the skilled artisan. The pressure increasing device 511 may be of any design known to the skilled artisan that is capable of increasing the working pressure of a cryogenic liquid.

In one embodiment of the present invention a high purity oxygen vapor stream 504 is provided. This high purity oxygen vapor stream 504 has a pressure that is approximately equal to the typical pressure within an oxygen pipeline. This high purity oxygen vapor stream 504 is introduced into the heat exchanging device 514, wherein it will exchange heat with streams 512, 524, 517 and 509 (hereinafter more fully described). The result of this heat transfer process within the heat exchanger device 514 will be a cold high purity oxygen stream 517, which may be at least partially condensed. If the oxygen pressure exceeds its critical pressure, there will be no phase change and stream 517 will be cooled to a temperature colder than its critical temperature. The cold high purity oxygen stream 517 is then directed to the pressure reduction device 505, which results in an at least partially condensed high purity oxygen stream 506.

The at least partially condensed high purity oxygen stream 506 is combined with a first liquid oxygen stream 518, which is being output from the cryogenic distillation system 501 via stream 502 and pumped by device 520 to a pressure of between about 2 bar and about 2.5 bar (alternately, between about 2.1 bar and about 2.4 bar), thereby resulting in an intermediate purity oxygen 509. The intermediate purity oxygen stream 509 is then introduced into the heat exchanging device 314, wherein it will be vaporized by exchanging heat with other streams to yield a warm intermediate purity low pressure gaseous oxygen stream 515, which may then be sent to the end user.

A gaseous feed air stream 513 is pretreated using methods and devices well known to those skilled in the art, then introduced into the heat exchange device 514, wherein it exchanges heat with streams 509, 524 and 512 (hereinafter more fully described). A portion of stream 513 may be sent via stream 528 to a system of compressor-expander 530 and 531 to provide the necessary refrigeration for the cryogenic unit. As a result of this heat transfer, the gaseous feed air stream 526 is cooled and introduced into the cryogenic distillation system 501. The cryogenic distillation system 501 produces a low purity liquid oxygen stream 502, and a liquid nitrogen stream 550. The pressure of the low purity liquid oxygen stream 502 is increased then combined with the at least partially condensed high purity oxygen 506 resulting in an intermediate purity oxygen. The liquid nitrogen stream 550 is extracted from the distillation system and then be introduced to pressure increasing device 511, resulting in a high pressure liquid nitrogen stream 512. This high pressure liquid nitrogen stream 512 is then introduced to heat exchange device 514, wherein it exchanges heat with streams 526 and 504, resulting in a vaporized high pressure nitrogen stream 516, which may then be sent to an end user or introduced into a pipeline.

As illustrated in FIG. 5, in one embodiment a portion 540 of the high purity oxygen stream 517 may be sent via stream 540 to the cryogenic distillation system 501. It is possible to send the totality of the high purity oxygen stream 517 to the column system 501, in this situation the mixing of high purity and low purity oxygen takes place in the sump of one column of the distillation system 501. This configuration would result in slightly warmer sump temperature which results in slightly higher system pressure, however, the richer vapor generated at the sump is slightly favorable for the distillation.

What is claimed is:

1. A method for providing low pressure and low purity oxygen, comprising:
   a) providing a cryogenic distillation system, wherein said cryogenic distillation system produces a first liquid oxygen stream and a liquid nitrogen stream, wherein said first liquid oxygen stream is at a first pressure;
   b) providing a second oxygen vapor stream, wherein said second oxygen vapor stream has a higher purity and a higher pressure than said first liquid oxygen stream, said second oxygen vapor stream coming from a pipeline;
   c) cooling and reducing the pressure of said second oxygen vapor stream to approximately said first pressure, thereby at least partially condensing said second oxygen stream;
   d) combining said at least partially condensed second oxygen stream and said first liquid oxygen stream to produce an intermediate purity liquid oxygen;
   e) vaporizing said intermediate purity liquid oxygen in a first indirect heat exchanging device, thereby producing an intermediate purity oxygen vapor stream;
   f) increasing the pressure of said liquid nitrogen stream by a pressure increasing device, thereby producing a high pressure liquid nitrogen stream; and
   g) exchanging heat between cooling gaseous feed air to said cryogenic distillation system, said cooling second oxygen vapor stream, said high pressure liquid nitrogen stream, and said warming intermediate purity oxygen vapor stream, in a second heat exchanging device, thereby producing a warm intermediate purity oxygen vapor stream, and a vaporized high pressure nitrogen stream.

2. The method of claim 1, wherein the pressure of said first liquid oxygen stream is increased prior to combining with the at least partially condensed second oxygen stream.

3. The method of claim 1, wherein said intermediate purity liquid oxygen is vaporized by condensing a portion of feed air.

4. The method of claim 1, wherein said cryogenic distillation system further comprises a high pressure column and a low pressure column.

* * * * *

UNITED STATES PATENT AND TRADEMARK OFFICE
CERTIFICATE OF CORRECTION

PATENT NO. : 8,136,369 B2
APPLICATION NO. : 11/500712
DATED : March 20, 2012
INVENTOR(S) : J Brugerolle et al.

It is certified that error appears in the above-identified patent and that said Letters Patent is hereby corrected as shown below:

Title Page, item 73

In the bibliographic data, under Assignees, replace the first named Assignee, "L'Air Liquide Societe Anonyme pour L'Etude, Paris (FR); et l'Exploitation des Procedes Georges Claude, Paris (FR)" with --L'Air Liquide Societe Anonyme pour L'Etude et L'Exploitation des Procedes Georges Claude, Paris (FR)--

Signed and Sealed this
Eighth Day of January, 2013

David J. Kappos
*Director of the United States Patent and Trademark Office*